United States Patent [19]

Herlin

[11] 4,228,335

[45] Oct. 14, 1980

[54] MACHINE FOR PRODUCING REINFORCEMENTS, IN PARTICULAR FOR REINFORCED CONCRETE, AND THE REINFORCEMENTS PRODUCED THEREBY

[76] Inventor: Bernard Herlin, c/o Standarm, 74, av. du General-de-Gaulle, 72000 Le Mans, France

[21] Appl. No.: 940,313

[22] Filed: Sep. 7, 1978

[30] Foreign Application Priority Data

Oct. 6, 1977 [FR] France .................. 77 30083

[51] Int. Cl.³ .............. B23K 11/32; B23K 37/04; B21F 27/10; B21F 15/08
[52] U.S. Cl. ........................... 219/56; 219/80; 219/160; 140/112; 228/49 R
[58] Field of Search .............. 219/56, 58, 79, 80, 219/158, 159, 160; 140/112; 228/4.1, 6 R, 47, 49 R; 29/163.5 CW

[56] References Cited

U.S. PATENT DOCUMENTS

| | | | |
|---|---|---|---|
| 2,899,537 | 8/1959 | Grebner | 219/79 |
| 3,745,297 | 7/1973 | Peshina et al. | 219/56 |
| 3,780,253 | 12/1973 | Senn | 219/56 X |
| 3,920,170 | 11/1975 | Colburn et al. | 219/56 X |
| 3,936,628 | 2/1976 | Ritter et al. | 219/56 |

FOREIGN PATENT DOCUMENTS

| | | | |
|---|---|---|---|
| 7335284 | 10/1973 | France . | |
| 7414953 | 4/1974 | France . | |
| 248118 | 7/1968 | U.S.S.R. | 219/56 |

Primary Examiner—B. A. Reynolds
Assistant Examiner—Keith E. George
Attorney, Agent, or Firm—O'Brien & Marks

[57] ABSTRACT

The machine for producing metal reinforcements in particular for reinforced concrete comprises a plurality of longitudinal members and at least one welded connecting member in the form of a strap in the shape of a closed or open frame. The machine comprises a strap carrier having open grooves for the passage of the longitudinal members which under the thrust exerted by a thrust device, come into direct contact with the straps waiting on the strap carrier so as to drive them one-by-one merely under the effect of friction to welding stations. The latter are adjustable in position and are in facing relation to zones of intersection between the longitudinal members and the straps. A selecting device and a stop device distribute the straps individually from the strap carrier to the welding stations. The strap carrier is fed with a series of straps required for a given reinforcement length by a withdrawable feeder and the welded reinforcements are discharged by a movable seizing device.

18 Claims, 16 Drawing Figures

MACHINE FOR PRODUCING REINFORCEMENTS, IN PARTICULAR FOR REINFORCED CONCRETE, AND THE REINFORCEMENTS PRODUCED THEREBY

The invention relates to a machine for producing in particular metal reinforcements for in particular reinforced concrete, these reinforcements consisting of at least two longitudinal members and connecting members, such as straps, which may have the shape of closed or open frames.

In concrete constructions, reinforcements are usually employed, which consist of rectilinear and parallel longitudinal members interconnected by bars or frames which are welded to the longitudinal members at the points of intersection, the frames being usually located in a plane perpendicular to the longitudinal members. The number of longitudinal members varies with the type of reinforcement to be produced and above all with its destination in the construction. Thus, the reinforcement may comprise only two longitudinal members which are interconnected by rectangular frames having rounded ends, or three longitudinal members to constitute reinforcements of triangular section, or even four, five, six or more longitudinal members, depending on whether square-, rectangular-, cylindrical-sectioned or other reinforcement sectional shapes are desired.

The construction of these reinforcements presents the problem of the continuous supply of the longitudinal members, the cyclic feeding of the straps or frames, the spot welding of the frames and longitudinal members in the zones of intersection and the removal and discharge of the finished reinforcements. Automatic machines exist (see French Pat. No. 7335,283 of 3.10.1973 and No. 7414,953 of 30.4.1974 owned by the applicant) in which the longitudinal members are supplied from reels and interconnected by welded bars after which the planar treillis thus produced (patent No. 7335,283) is put into desired sectional shape by forming means after which the reinforcement is cut to the desired length in a continuous manner, or the bars (patent No. 7414,953) are bent by successive passages through bending means and then welded to the longitudinal members, the latter being in this case already arranged in accordance with the desired sectional shape of the reinforcement to be produced.

The present invention relates to a machine of more simple design which uses preferably longitudinal members which are already straightened and cut to length and straps already put into the shape of frames which are open or closed by welding.

Moreover, by simple settings, the machine may also be rendered suitable for producing reinforcements having two or more longitudinal members, depending on the section it is desired to produce, although, in the embodiment chosen by way of example, there are four longitudinal members for producing a square-sectioned reinforcement.

According to the invention, there is provided a machine for producing metal reinforcements, in particular for reinforced concrete, comprising at least two longitudinal members and connecting members and in particular a plurality of longitudinal members which are interconnected by straps welded in the shape of closed or open frames, said machine comprising a strap carrier provided with open grooves for the passage of the longitudinal members which, under the thrust exerted by thrust means, come directly into contact with the waiting straps so as to drive them one-by-one by the simple effect of friction to welding stations which have an adjustable position and are located in facing relation to zones of intersection of the longitudinal members and straps, selecting and stop means for distributing the straps on the strap carrier individually to the welding stations, a withdrawable feeder for feeding to the strap carrier a series of straps required for a given length of reinforcement, and movable seizing means for discharging the welded reinforcements.

According to the one feature of the invention, the strap carrier is a beak-iron whose cross-sectional shape corresponds to the shape and dimensions of the straps and has axially-extending slots in which are rotatably mounted rotary barrels comprising an open-sided groove for receiving a longitudinal member to be welded and an open-sided groove for receiving a waiting longitudinal member, said barrels being provided with coupling means for coupling them to means for driving them in rotation, the longitudinal members being driven simultaneously, by a pivotal movement through 180°, from the waiting position to an operative position in which they are brought into direct contact with the straps mounted on the beak-iron.

According to another feature, the rotary barrels are located on the periphery of the beak-iron, and the grooves are open throughout their length so that the longitudinal members in the operative position are flush with the faces of the beak-iron and come into frictional contact with the straps carried by the latter.

According to one embodiment of the invention, the selecting and stop means comprise at least one radial stop which stops the packet of straps waiting on the beak-iron, this stop being movable in a vertical plane, and, furthermore, a selector which is also movable in translation in the same plane, the distance between the stop and the selector being equal to the thickness of a strap.

According to a preferred feature, each welding station is adjustably movable radially of the beak-iron and comprises two side-by-side electrodes contained in a common plane, the welding being an indirect welding with the longitudinal members ensuring the electrical continuity between the two electrodes.

A machine according to the invention is shown by way of a non-limitative example in the accompanying drawings in which.

Figures 6A, 6B, 6C:
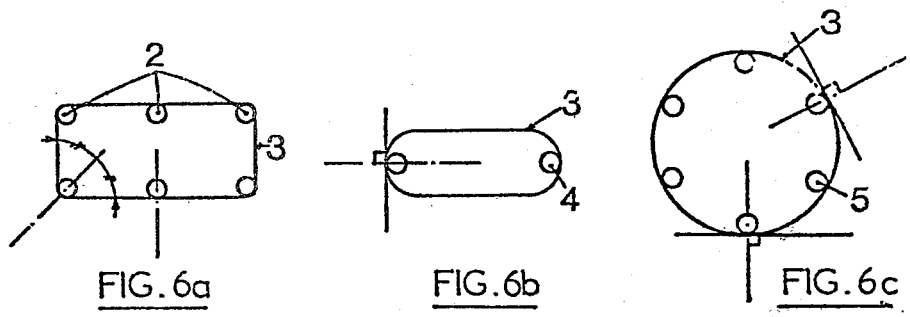
FIG. 6a to 6e are diagrammatic sectional views of reinforcements that the machine according to the invention is capable of producing.
Figure 6D:
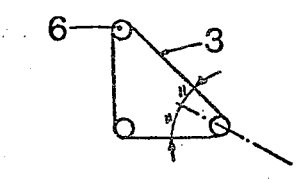
Figure 6E:
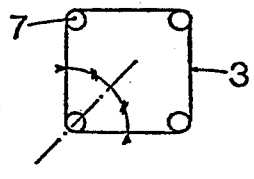

The machine according to the invention mainly comprises a strap carrier, termed hereinafter "beak-iron" 1, on which the straps or stirrups in the shape of a frame for producing a reinforcement are stored, a withdrawable feeder for feeding the straps to the beak-iron, welding stations for interconnecting the longitudinal members and the straps by a welding in the zone of intersection or overlapping thereof, shifting means for the longitudinal members comprising a tongs carriage for advancing the longitudinal members as welding proceeds and a tongs carriage for removing and discharging the reinforcements issuing from the welding stations. As mentioned before, the beak-iron (FIG. 1) may have any cross-sectional shape, depending on the number of longitudinal members employed and more particularly on the desired cross-sectional shape of the reinforcement to be produced. FIGS. 6a to 6e indeed show that it is possible to produce with this machine reinforcements of different cross-sectional shapes, which is one of the essential advantages of the machine. In the case of FIG. 6a, there are six longitudinal members 2 interconnected by a rectangular-shaped frame 3. In the case of FIG. 6b, the frame 3 has an oval shape and interconnects two longitudinal members 4. The reinforcement may also have a circular cross-sectional shape as illustrated in FIG. 6c with six longitudinal members and a circular frame 3, or a triangular cross-sectional shape with three longitudinal members 6 and a frame 3 having a right-angled triangular shape or a rectangular or square cross-sectional shape with four longitudinal members 7 and a frame 3 having perpendicular sides. For reasons of simplification, the ensuing description will relate to the last-mentioned case in which the reinforcement has a square cross-sectional shape.

The longitudinal members are longitudinally extending wires or rods forming the structure of the reinforcement and the straps, which may be closed or open frames, form the members perpendicular to the longitudinal members and interconnecting the latter.

Figure 2:
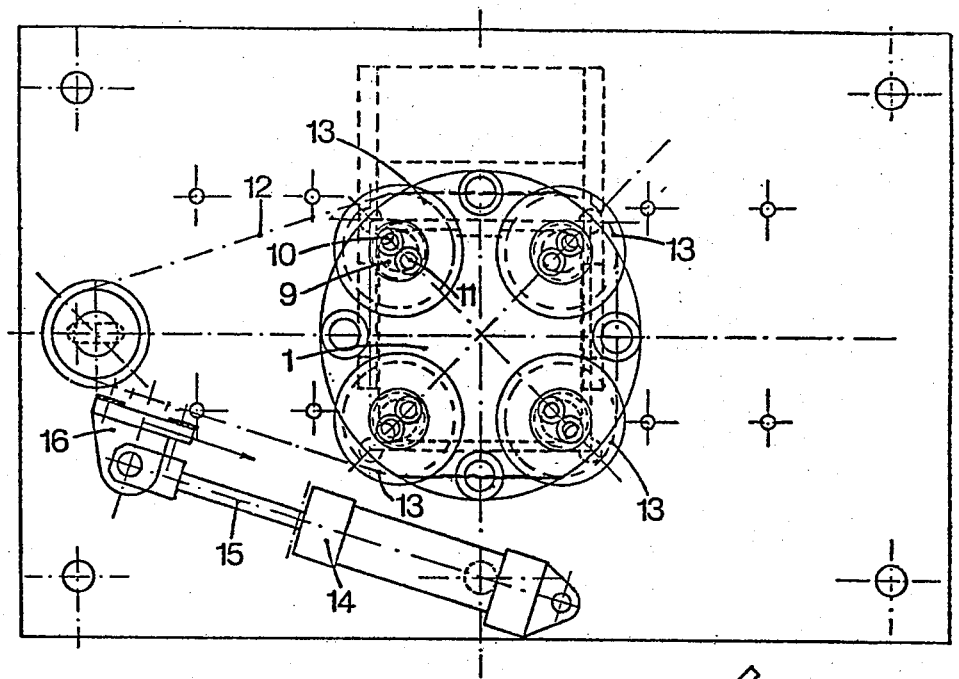
FIG. 2 is a rear end view of the beak-iron.
Figure 3:
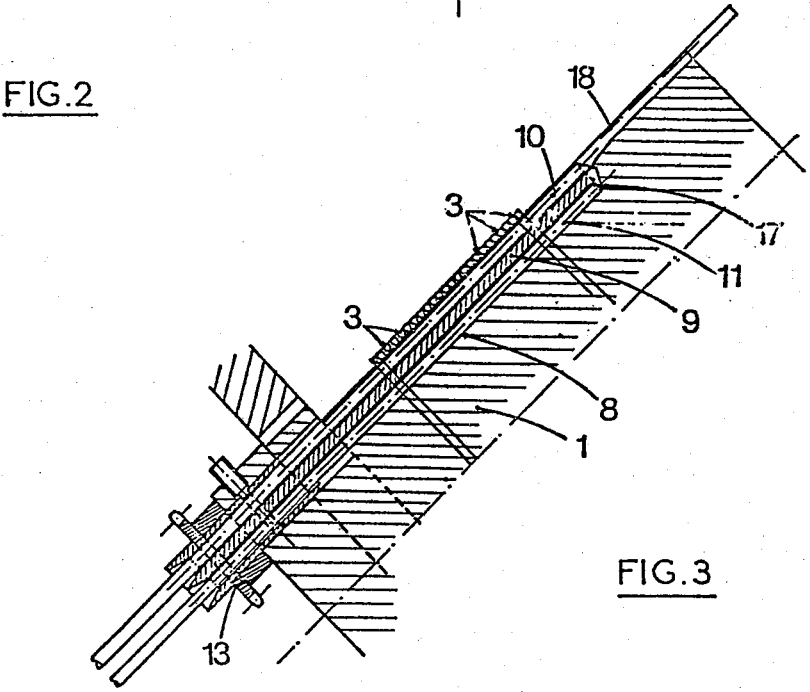
FIG. 3 is a partial sectional view of the beak-iron showing one of the longitudinal member barrels.

According to the invention, the beak-iron or strap carrier 1 is in the form of a solid metal block whose corners in the presently-described embodiment have longitudinally extending slots in which are disposed, as more clearly seen in FIGS. 2 and 3, rotary barrels 9 which are in the shape of cylinders in which are formed along two generatrices thereof open-sided grooves 10 and 11 which extend along a part of the beak-iron.

These barrels are rotatably mounted in the slots 8 of the beak-iron and driven by drive means, for example by racks or, as illustrated in FIG. 2, by a chain 12 which extends around four sprocket wheels 13 fixed to the rear end of the barrels (FIG. 3). This chain is shifted by a double-acting jack 14 whose rod 15 is fixed to a fork 16 secured to the chain 12. The displacement of this jack causes the chain to move through a given travel which corresponds to an angular movement of the rotary barrels through 180°. The two grooves 10 and 11 of each barrel of the beak-iron are alternately an "operative groove" or a "waiting groove". In the case of FIG. 3, the groove 10 is the operative groove since it is that which is flush with the outer surface of the beak-iron, whereas the groove 11 is the waiting groove since it is located within the beak-iron in a position diametrically opposed to the groove 10.

A feature of the invention resides in the fact that the longitudinal member disposed in the groove 10 extends slighly beyond the periphery of the beak-iron so that the straps waiting on the beak-iron will be maintained under tension by the longitudinal members and the linear displacement of the latter will cause the displacement of the straps or frames merely by the effect of the contact between the straps and longitudinal members. The waiting groove 11 enables the machine to be loaded while the longitudinal members located in the operative grooves are assembled with the frames. The end of the groove 11 has a stop 17 which limits the extent to which the waiting longitudinal member is introduced after which this waiting longitudinal member is brought to the operative position 10 and is free to move owing to the provision of slots 18 in the beak-iron. Thus the beak-iron operates as a strap magazine, a device for supplying operative longitudinal members, a device for storing waiting longitudinal members and a reaction block supporting the welding force. A series of straps 3 (FIG. 3) is fed to the beak-iron by a withdrawable feeder such as that illustrated in FIGS. 8 to 10. This feeder comprises two arms 19 and 20 which are pivotally mounted on a splined shaft 21 rotated by a jack 22 (FIG. 9) which is connected to the splined shaft through a mechanical coupling $22_1$ and associated with a shock-absorbing device. The latter comprises a link and crank system 23 on which is fixed a bracket 26 which bears against the rod 25 of the shock-absorber 24 at the end of its travel. The two arms 19 and 20 of the strap feeder are not only movable in rotation but also in reciprocating translation by two jacks 27 and 28 the rods of which are coupled at 29 to two sleeves $29_1$ $29_2$ which are slidable on two guide bars $29_3$ and coupled to the arms 19,20 through two rollers $29_4$. These two arms are slidable on the splined shaft 21, the arm 19 having on the front end face thereof two L-section member carriers 31 on which are fixed the L-section members 32 which partly surround the pins 30, these L-section members being adapted to exert a thrust on the straps placed on the pins manually.

Figure 8:
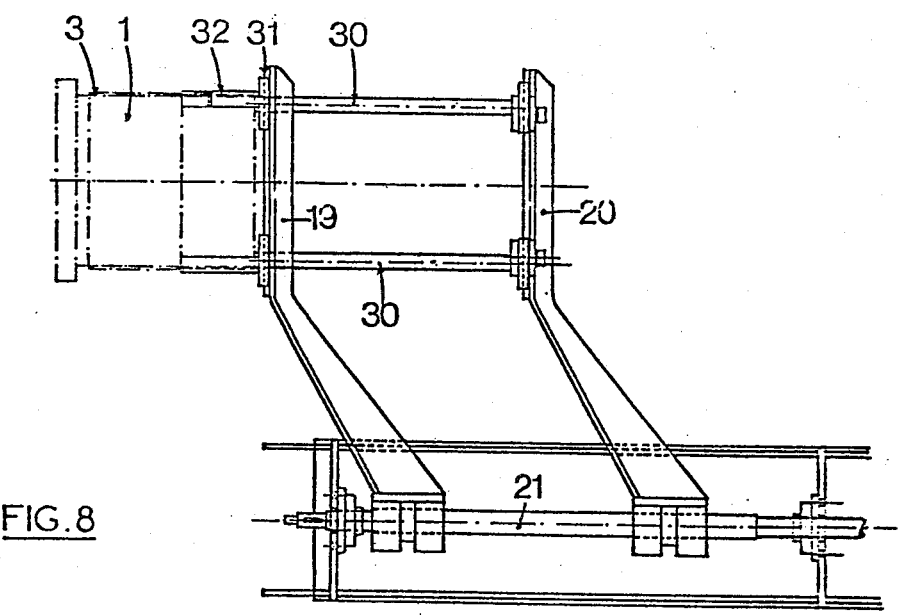
FIG. 8 is a top plan view of the strap feeder.
Figure 9:
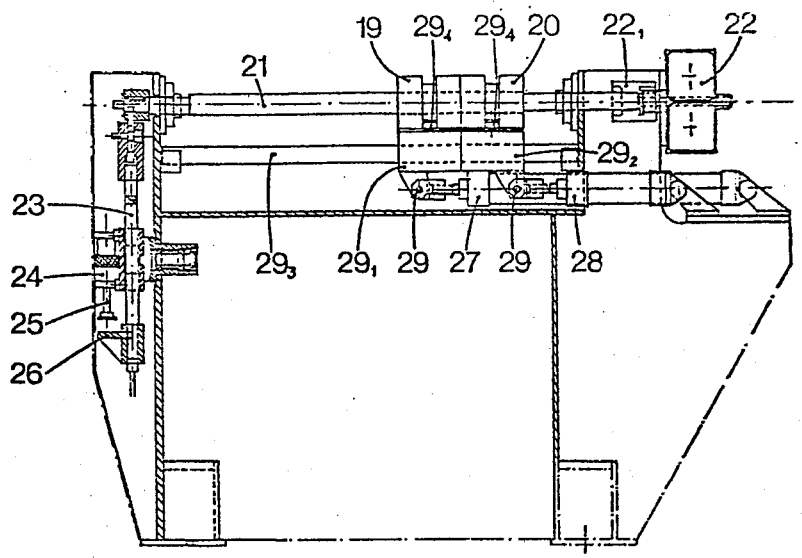
FIG. 9 is a sectional view of the side of the feeder seen in FIG. 8.

In the position shown in FIG. 8, the front arm 19 is at the end of its travel and the series or packet of straps required for a reinforcement of given length has been thrust onto the beak-iron 1 surrounded by the L-section members 32 which, upon movement of the arm 19 remove the straps from the pins 30.

Figure 10:
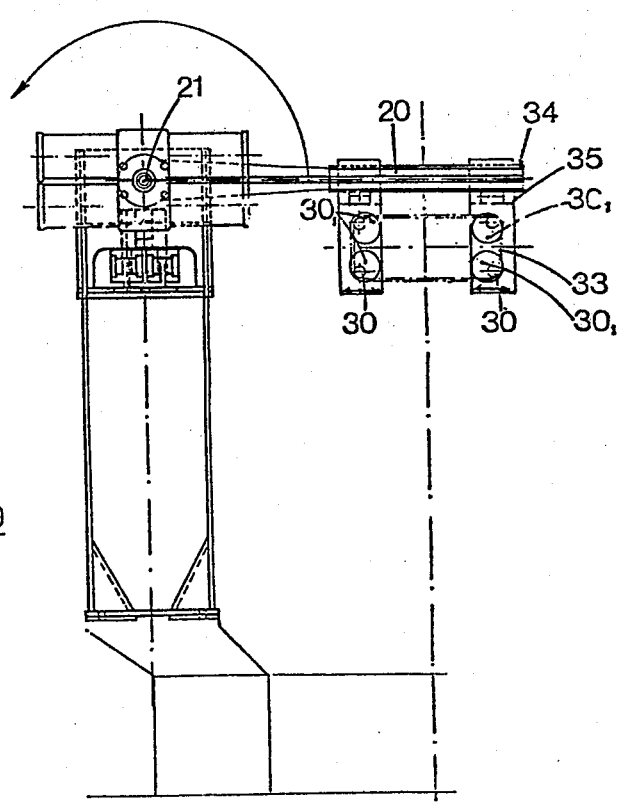
FIG. 10 is a rear view of the feeder shown in FIGS. 8 and 9.

As illustrated in FIG. 10, the two arms 19 and 20 of the feeder are movable angularly through 180° so as to be put either in the position shown in FIG. 10 (position for feeding and loading the beak-iron) or in an opposite position (position in which the arms are withdrawn and the straps are manually placed on the pins 30). In FIG. 10 it can be seen that the carrier arm 20 supports the four pins 30 on which the straps 33 have been mounted. By a way of modification, the straps 33 have been shown to have a rectangular cross-sectional shape. It is moreover possible to adjust the distance between the pins 30, depending on the dimensions of the beak-iron and consequently on the type of reinforcement to be produced, this adjustment being carried out in a conventional manner by means of an eccentric $30_1$ and dovetail-sectioned slideways 34 on which the pin carriers 35 are slidable. It is essentially required that the distance between the pins define an imaginary cross-sectional shape which exactly corresponds to that of the beak-iron so that the straps disposed on these pins are brought onto to the beak-iron without transition.

Figure 11:
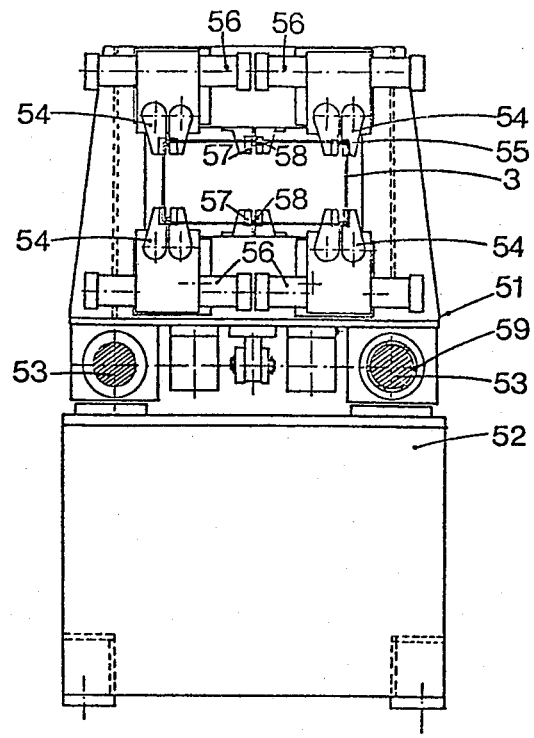
FIG. 11 is an end elevational view of the reinforcement removing carriage.
Figure 12:
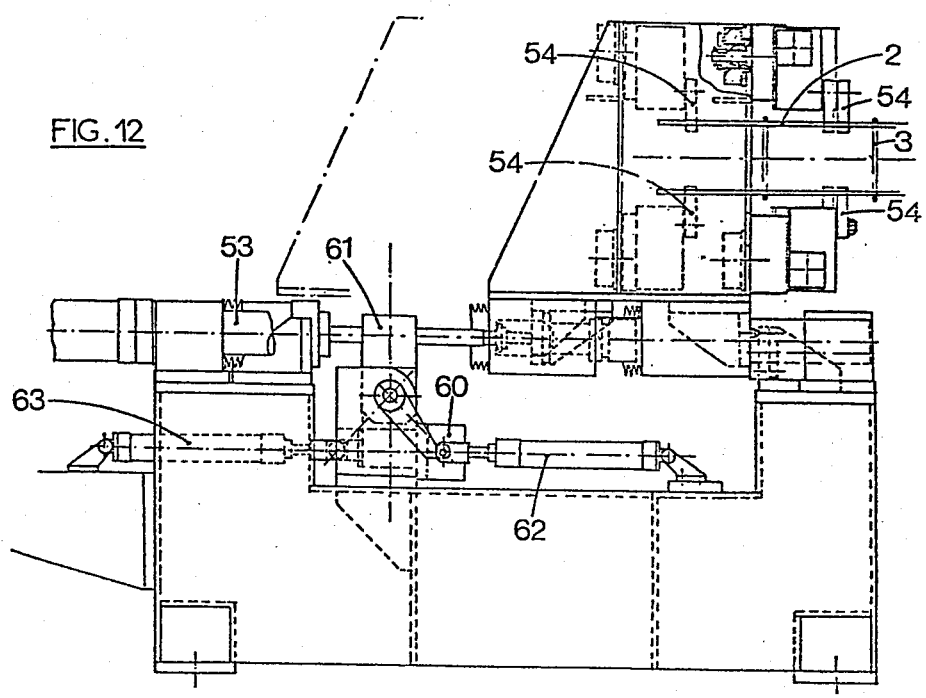
FIG. 12 is a side elevational view of the carriage shown in FIG. 11.

This feeder for feeding straps to the beak-iron is arranged to be withdrawable when the beak-iron has been fed with straps so as to clear the way for the reinforcement removing carriage seen in FIGS. 11 and 12.

Figure 4:
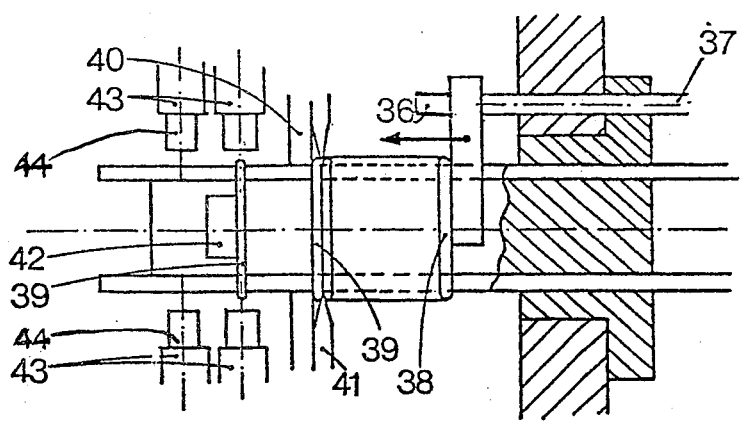
FIG. 4 is a diagrammatic view illustrating the distribution of the straps and the welding thereof to the longitudinal members.

When straps have been fed to the beak-iron and the feeder has been withdrawn, the straps are individually distributed by a strap selecting and releasing structure comprising thrust means, selecting means and stop means, as illustrated in FIG. 4. The packet of straps waiting on the beak-iron is first displaced in the downstream direction by a strap thrusting fork 36 which is moved linearly in translation on the bars 37 by a jack (not shown). This fork engages the last strap 38 of the packet and thrusts all of the straps until the downstream strap 39 comes into contact with a selecting stop 40. The stop is movable in translation in a vertical plane by a double-acting jack and is brought to the lower position shown in FIG. 4 before the fork 36 is operative. When the packet of straps is stopped by the selecting stop, a selector 41 which is also movable in a vertical plane by a jack, selects a strap (the distance between the selecting stop and the selector being equal to the thickness of a strap). When the selector is in the lower position and has thus removed a strap from the waiting packet of straps, the selecting stop is automatically raised so that the strap 39, separated from the other straps by the selector 41, can be brought to the welding station. The strap 39 is shifted by the associated longitudinal members located in the operative grooves 10 and freely slidable in the slots 18 in the beak-iron. Indeed, as mentioned before, as the frames exert an elastically yieldable force on the operative longitudinal members and as the longitudinal members are continuously urged towards the welding stations, these longitudinal members drive the selected strap 39 to a welding stop 42 merely by the effect of friction and adherence, the other waiting straps being held stationary by the selector 41 which has remained in position. The strap 39 which has been stopped in its displacement by the welding stop 42, is positioned in facing relation to welding stations or devices 43 the details of which are illustrated in FIG. 1.

In the presently-described embodiment, in which the beak-iron 1 has a square cross-sectional shape and there are four longitudinal members, only four welding stations or devices 43 will be used which are oriented diagonally and make an angle of 90° therebetween. Indeed, these welding stations are directed at the corners of the beak-iron so as to weld the frames in the zone of intersection thereof with the longitudinal members. Each welding station comprises two electrodes 44, the function of which will be explained hereinafter and a welding transformer 45 which is movably mounted on a slide 46 for the purpose of bringing the welding station to an operative position or a withdrawn position.

The welding station is movable in either direction, indicated by arrow F so as to move the electrodes 44 away from or toward the longitudinal member and frames to be welded. When the welding stations are brought to the working position, a second axial adjustment is effected in the direction indicated by arrow $F_1$, by means of a slide and an eccentric 47 so as to bring the electrodes in the vicinity of the frames to be welded.

Figure 1:
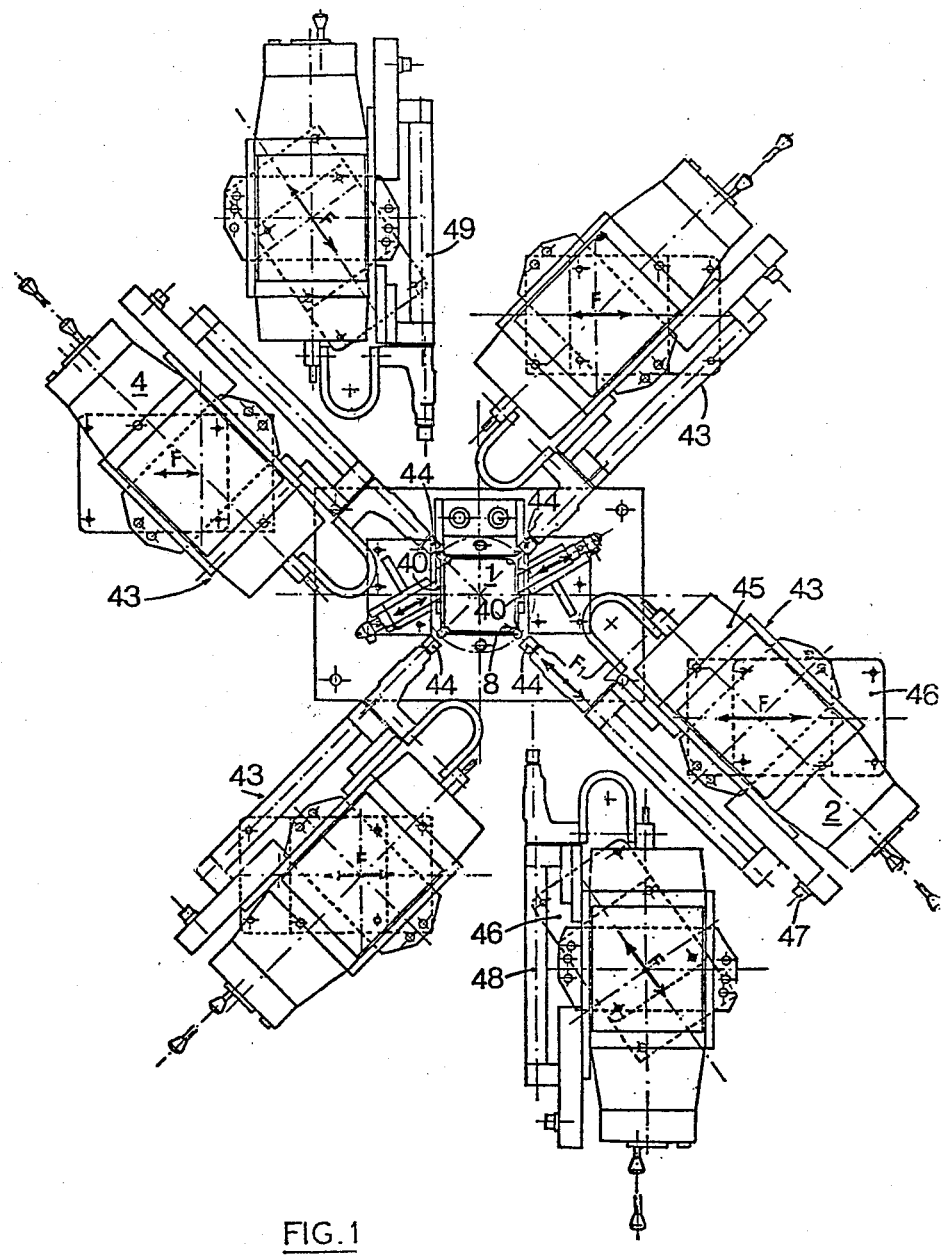
FIG. 1 is an end elevational view of the beak-iron and six welding stations, four of which are operative.

In the embodiment illustrated in FIG. 1, which concerns square shaped frames, the other welding stations 48 and 49 are in their withdrawn position since they are not used. However, these stations may be brought to the operative position, for example in the case of reinforcements having six longitudinal members, by a simple setting of the slide 46 whereby the welding station can be shifted laterally and radially towards the beak-iron.

Figure 5:
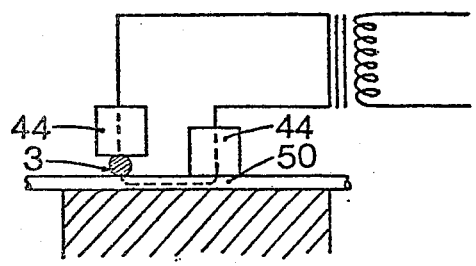
FIG. 5 is a diagrammatic view illustrating the operation of one of the welding station or devices.

The welding stations comprise two electrodes to permit an indirect welding as shown in FIG. 5, one of the electrodes coming into contact with the strap 3, and the other being spaced away and in contact with the longitudinal member 50. In this case, the longitudinal member acts as a conductor so that, as opposed to conventional welding units, the electrodes are located on the same side of the members to be assembled, whereas normally the two electrodes are on opposite sides and pinch the longitudinal member and strap therebetween. This welding unit comprises a transformer on which two pneumatic jacks supporting the electrode holders and the electrodes are fixed by adjustable systems.

When the first strap 39, such as that shown in FIG. 4, has been welded, the welding stop 42 is withdrawn to allow the advance of the longitudinal members and the distribution of a new strap (driven along by the longitudinal members) which has been selected, as before, by the selecting stop 40 and the selector 41. This procedure is repeated for the individual distribution of the straps and the spot-welding thereof to the longitudinal members.

When the reinforcement issues from the welding stations, it is taken up by a removing carriage shown in FIGS. 11 and 12. This carriage 51 is sliable on two bars 53 of a stand 52. The moving part in the presently-described embodiment comprises four sets of tongs 54 adjustable in position. These tongs consist of two jaws which take up the longitudinal members 55 of the reinforcement issuing from the welding stations, the tongs being closed and opened by double-acting jacks 56. There have been shown additionally two sets of tongs 57 which may serve to drive two additional longitudinal members 58 when it concerns a reinforcement having six longitudinal members.

The purpose of the lack of an exact correspondence between the reinforcement produced by the beak-iron shown in FIG. 1 and the reinforcement shown in FIG. 11 is to show that the machine is also suitable in particular for reinforcements having four or six longitudinal members. The carriage is movably mounted on the bars 53 by axial rolling bearings 59, the displacement of this carriage being determined by withdrawable stops, such as stops 60, 61 which are respectively brought into position by jacks 62,63, which permits a programmed control of the production.

OPERATION

First of all, the feeder is supplied with straps manually by placing on the pins 30 of the feeder (FIG. 8) a packet of straps corresponding to a given length of reinforcement. The number of straps takes into account both the length of the longitudinal members and the pitch or spacing between the straps on the reinforcement.

When the withdrawable feeder has been supplied with straps in this way, the two arms are pivoted through 180° so as to bring the pins 30 in facing relation to the beak-iron 1. The thrust arm 19 is then shifted in translation along the splined shaft 21 so that the L-section members 32 thrust the packet of straps onto the beak-iron and thereby feed the straps to the latter. When the beak-iron has been supplied with straps, the arms 19 and 20 are brought back to the withdrawn position (angular displacement through 180°) so as to provide them with a new supply of straps.

The barrels 9 of the beak-iron 1 are then rotated so as to bring the waiting longitudinal members in abutment in the grooves 11 to the operative position, which results in friction between said longitudinal members and the straps so that this contact is sufficient to drive the straps one by one along the axis of the welding station. A further supply of longitudinal members to the waiting grooves is then effected in such manner that there are minimum losses of time in the operation of the machine.

Figure 7:
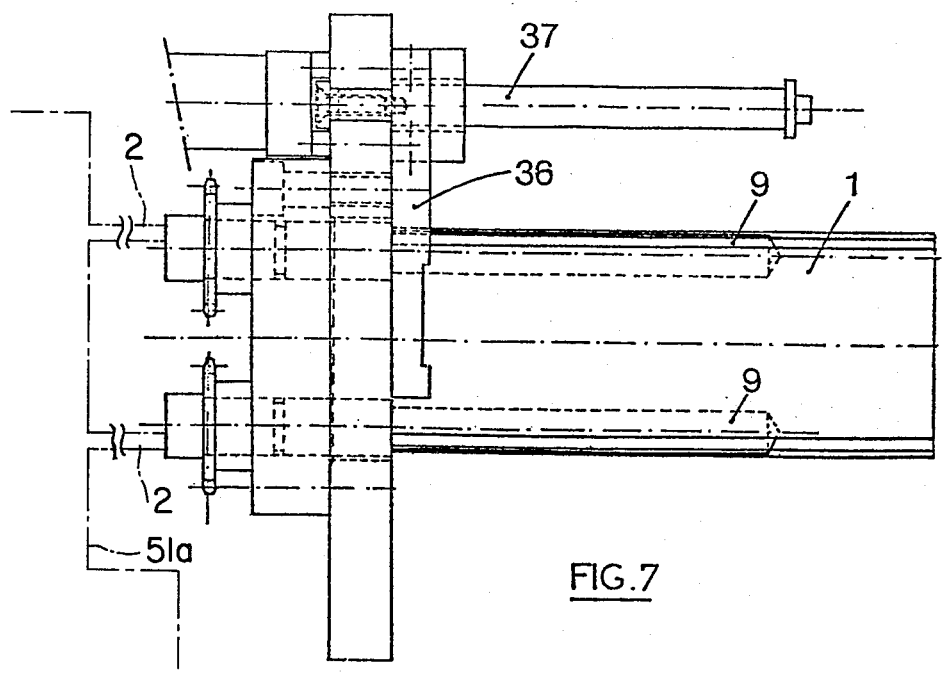
FIG. 7 is a plan view of the beak-iron and the straps thrusting fork.

At this stage, the longitudinal members brought to the operative position 10 are advanced step-by-step in the downstream direction by shifting means comprising a tongs device 51a (FIG. 7) equivalent to the removing carriage 51. But before this the packet of straps waiting on the beak-iron is shifted to the selecting stop 40 by the fork 36 shown in particular in FIGS. 4 and 7. A strap is then individually selected from the pocket by the selector 41 and then the selecting stop 40 is made to rise so that the thus selected frame or strap can be driven to the welding stop 42 merely by the effect of friction between this strap and the longitudinal members within the strap as the longitudinal members are advanced by the tongs device. When the strap has reached the welding stop 12 and is positioned in facing relation to the welding stations, the electrodes are brought into contact respectively with the strap and the longitudinal member for effecting an indirect welding. The welding stop 42 is then withdrawn to allow the free passage of the welded strap, a second strap being selected by the stop 40 and the selector 41 to be again driven by the longitudinal members when the latter are advanced by the tongs device.

The step-by-step advance of the reinforcement is achieved by a tongs carriage the travel of which is adjustable, this carriage acting on the four longitudinal members simultaneously. After the welding of the last strap of a reinforcement, a transfer device removes the finished reinforcement from the welding station and thus leaves a free passage for the strap feeder.

All of the movements are achieved by pneumatic jacks and all the component parts are rapidly adjustable, only the beak-iron being particular to the model of the reinforcement to be produced. This machine permits:

the industrial production of standard reinforcements, a constant quality of the product, a new production method, no fatigue of the metal after welding (which is the case in the conventional method of folding a welded trellis), a considerable improvement in the working conditions and safety of personnel, a rate of production never achieved by existing machines or methods of production, it being possible to achieve on a prototype machine the welding of 30 straps per minute, namely the hourly production of about 70 reinforcements 6 meters long with 15 straps (taking into account automatic feeding times) irrespective of the number of longitudinal members, namely 2, 3, 4, 5, 6 longitudinal members, or the hourly production of 45 reinforcements 6 meters long with 30 straps.

It must be understood that the invention is not intended to be limited to the embodiments described hereinbefore, since it is possible to envisage other forms and other embodiments without departing from the scope of the invention as defined in the claims.

I claim:

1. A machine for producing a metal reinforcement for in particular reinforced concrete and comprising a plurality of metal longitudinal members and a plurality of metal straps in the form of frames which may be open or closed and are welded to the longitudinal members, said machine comprising a carrier for receiving and carrying a series of the metal straps, means defining open grooves extending longitudinally on the strap carrier for respectively receiving the metal longitudinal members, shifting means withdrawably engageable with the longitudinal members for advancing the longitudinal members step-by-step in a given direction in the grooves, the grooves having a depth which is such that the longitudinal members project sufficiently from the strap carrier to have a frictional contact with the straps which is sufficient to cause the straps to be driven along with the longitudinal members when the longitudinal members are advanced by the shifting means, structure for selecting and releasing only one strap at a time from said series of straps carried by the strap carrier, and welding devices arranged around the strap carrier downstream of the strap selecting device relative to said given direction and located in facing relation to zones of intersection between the longitudinal members and the straps released from the series of straps by the selecting and releasing structure.

2. A machine as claimed in claim 1, wherein said strap selecting and releasing structure comprises a selecting stop member and a selector which are movable between operative positions in which the stop member and selector preclude movement of the series of straps in said given direction and withdrawn positions in which the selecting stop member and selector allow movement of the series of straps in said given direction, the selector being spaced from the selecting stop member, a distance substantially corresponding to the thickness of a strap, and thrust means for urging the series of straps toward the selecting stop member and selector, the selecting stop member being operative in said operative position to first stop, a first strap of the series of straps while the selector is placed in its operative position between said first strap and the remainder of the straps, after which the selecting stop member is withdrawn to release said first strap while the selector precludes movement of the remainder of the straps.

3. A machine as claimed in claim 1, wherein the number of the welding devices equals the number of longitudinal members and the welding devices are selectively orientable to be perpendicular to the surfaces of the strap-carrier, tangent to the periphery of the strap-carrier and diagonal with respect to the corners of the strap-carrier.

4. A machine as claimed in claim 1, wherein the strap carrier comprises a beak-iron having a cross-sectional shape which substantially corresponds to the shape and dimensions of the straps, means defining in the beak-iron axially-extending slots, rotary barrels rotatably mounted in said slots and defining an open groove for receiving a longitudinal member in a position for welding the longitudinal member to the straps and an open groove for receiving a waiting longitudinal member, means for driving the barrels in rotation in said slots and coupling means for coupling the barrels to said means for driving the barrels in rotation, whereby the longitudinal members are driven simultaneously by a rotary movement of said barrels through 180° in said slots, from a waiting position to an operative position in which operative position they are in direct contact with the straps mounted on the beak-iron.

5. A machine as claimed in claim 4, wherein the rotary barrels are located on the periphery of the beak-iron, said grooves being open throughout their length so that the longitudinal members are in frictional contact with the straps that the back-iron carries.

6. A machine as claimed in claim 1, wherein the selecting and releasing structure comprises at least one stop member movable in a substantially vertical plane between operative and withdrawn positions and a selector which is movable in translation in a substantially vertical plane, the distance between the stop member and the selector being equal to the thickness of a strap, the selector being movable between a withdrawn inoperative position and an operative position in which operative position it stops the series of straps from moving and allows the release of the strap located downstream of the selector relative to said given direction when the stop member is in its withdrawn position.

7. A machine as claimed in claim 6, comprising double-acting jacks for moving the selector and the stop member in said planes.

8. A machine as claimed in claim 1, wherein each welding station is adjustably movable transversely of the carrier and comprises two side-by-side electrodes contained in a plane containing the corresponding longitudinal members, the welding being indirect and the longitudinal member ensuring the electrical continuity between the two electrodes.

9. A machine as claimed in claim 8, comprising a slide for each welding station whereby the welding stations are movably mounted so as to be capable of being brought selectively to an operative position and a withdrawn position, depending on the number of welding stations to be used, that is to say, depending on the number of longitudinal members and consequently on the cross-sectional shape of the reinforcement to be produced.

10. A machine as claimed in claim 1, comprising reinforcement seizing means for discharging the welded reinforcement and comprising a carriage located downstream of the strap-carrier relative to the direction of travel of the straps on the strap-carrier and movable in reciprocating translation and means for moving the carriage in translation, said carriage comprising openable tongs which are located in facing relation to the longitudinal members of the reinforcement, and means for closing and opening the tongs.

11. A machine as claimed in claim 10, comprising a movable end-of-travel stop and means for controlling the position of the stop and associated with the carriage for determining the travel of the carriage.

12. A machine for producing a metal reinforcement for in particular reinforced concrete and comprising a plurality of metal longitudinal members and a plurality of metal straps in the form of frames which may be open or closed and are welded to the longitudinal members, said machine comprising a carrier for receiving and carrying a series of the metal straps, means defining open grooves extending longitudinally on the strap carrier for respectively receiving the metal longitudinal members, shifting means withdrawably engageable with the longitudinal members for advancing the longitudinal members step-by-step in a given direction in the grooves, the grooves having a depth which is such that the longitudinal members project sufficiently from the strap carrier to have a frictional contact with the straps which is sufficient to cause the straps to be driven along with the longitudinal members when the longitudinal members are advanced by the shifting means, structure for selecting and releasing only one strap at a time from said series of straps carried by the strap carrier, welding devices arranged around the strap carrier downstream of the strap selecting device relative to said given direction and located in facing relation to zones of intersection between the longitudinal members and the straps released from the series of straps by the selecting and releasing structure, a feeder for feeding to the strap carrier a series of said straps required for a given length of reinforcement, the strap feeder being movable between an operative position longitudinally in alignment with the carrier for feeding the series of straps to the carrier and a withdrawn position and comprising a splined shaft, two pivotal arms mounted to be movable in axial translation on the splined shaft, one of said two arms comprising fixed pins for receiving the number of straps required for producing a reinforcement, the other arm being a thrust arm and provided with strap-removing means for removing the straps from the fixed pins and transferring the straps to the strap carrier when the feeder is in said operative position and the thrust arm is axially displaced on said splined shaft, the imaginary cross-sectional shape defined by the strap-carrying pins being identical to the cross-sectional shape of the strap-carrier so as to permit the passage of the straps from the pins to the strap carrier without transition.

13. A machine as claimed in claim 12, wherein the two pivotal arms are movable through 180° about the axis of said splined shaft so that the feeder may be brought selectively to said operative position (for feeding the straps to the strap carrier) and in the withdrawn position (for supplying the straps to the feeder), the machine further comprising movable seizing means for seizing and discharging the welded reinforcement, the withdrawn position of the feeder allowing operation of the movable seizing means.

14. A machine as claimed in claim 12, wherein the strap-removing means provided on the thrust arm of the feeder comprise L-section members which partly surround the strap-carrying pins for thrusting the straps onto the strap carrier when the thrust arm is axially displaced.

15. A machine as claimed in claim 12, comprising two jacks for driving on said splined shaft the pivotal arms in reciprocating translation and a third jack for driving the pivotal arms in rotation about the axis of said splined shaft.

16. A machine as claimed in claim 12, comprising a rotary jack for rotating the splined shaft and an adjustable shock-absorbing device associated with the splined shaft.

17. A machine as claimed in claim 12, comprising slideways and eccentrics combined with the strap-carrying pins for adjusting the distance between said pins so as to permit the feeder to be adapted to strap-carriers of different cross-sectional dimensions.

18. A machine for producing a metal reinforcement for in particular reinforced concrete and comprising a plurality of metal longitudinal members and a plurality of metal straps in the form of frames which may be open or closed and are welded to the longitudinal members, said machine comprising a carrier for receiving and carrying a series of the metal straps, means defining open grooves extending longitudinally on the strap carrier for respectively receiving the metal longitudinal members, shifting means withdrawably engageable with the longitudinal members for advancing the longitudinal members step-by-step in a given direction in the grooves, the grooves having a depth which is such that the longitudinal members project sufficiently from the strap carrier to have a frictional contact with the straps which is sufficient to cause the straps to be driven along with the longitudinal members when the longitudinal members are advanced by the shifting means, structure for selecting and releasing only one strap at a time from said series of straps carried by the strap carrier, welding devices arranged around the strap carrier downstream of the strap selecting device relative to said given direction and located in facing relation to zones of intersection between the longitudinal members and the straps released from the series of straps by the selecting and releasing structure and withdrawable stop means located in a position to stop the strap released by the selecting and releasing structure in a position of alignment with the welding devices for welding it to the longitudinal members.

* * * * *